(12) United States Patent
Nakano et al.

(10) Patent No.: US 7,082,214 B2
(45) Date of Patent: Jul. 25, 2006

(54) AUTHENTICATION DEVICE, AUTHENTICATION SYSTEM, AND SENSOR

(75) Inventors: Ken Nakano, 5-8-504, Takashima 2-chome, Nishi-ku, Yokohama-shi, Kanagawa 220-0011 (JP); Jun Hyodo, Tokyo (JP)

(73) Assignees: Fujitsu Limited, Kawasaki (JP); Ken Nakano, Yokohama (JP)

( * ) Notice: Subject to any disclaimer, the term of this patent is extended or adjusted under 35 U.S.C. 154(b) by 75 days.

(21) Appl. No.: 10/849,956

(22) Filed: May 21, 2004

(65) Prior Publication Data

US 2005/0100198 A1 May 12, 2005

(30) Foreign Application Priority Data

Nov. 10, 2003 (JP) ............................. 2003-379590

(51) Int. Cl.
*G06K 9/00* (2006.01)
(52) U.S. Cl. ...................... 382/124; 382/115; 340/5.53
(58) Field of Classification Search ................ 382/124, 382/115–116, 122; 340/5.53
See application file for complete search history.

(56) References Cited

U.S. PATENT DOCUMENTS

| 6,289,114 B1 | 9/2001 | Mainguet | 382/124 |
| 6,459,804 B1 | 10/2002 | Mainguet | 382/124 |
| 6,914,517 B1* | 7/2005 | Kinsella | 340/5.83 |
| 2003/0123714 A1* | 7/2003 | O'Gorman et al. | 382/124 |
| 2003/0156744 A1* | 8/2003 | Hashimoto | 382/124 |
| 2004/0234110 A1* | 11/2004 | Chou | 382/122 |

FOREIGN PATENT DOCUMENTS

| EP | 0813164 B1 | 3/2003 |
| JP | 10-91769 | 4/1998 |
| JP | 2004171307 | * 11/2002 |

OTHER PUBLICATIONS

Kamisaka, Yoshinori et al, "Algorithm for pattern recognition and learning", bun-ichi-sogo-shuppan with partial translation, 1990.

* cited by examiner

*Primary Examiner*—Thuy V. Tran
*Assistant Examiner*—Chuc Tran
(74) *Attorney, Agent, or Firm*—Armstrong, Kratz, Quintos, Hanson & Brooks, LLP

(57) ABSTRACT

The present invention relates to an authentication device for authentication, and performs authentication by using both physical characteristics and behavioral characteristics in a comprehensive manner. The present invention performs authentication by using time-series data including both physical characteristics such as a fingerprint and behavioral characteristics such as "movement" obtained by sliding a finger on the device (or sliding the device on a finger).

6 Claims, 18 Drawing Sheets

US 7,082,214 B2

AUTHENTICATION DEVICE, AUTHENTICATION SYSTEM, AND SENSOR

BACKGROUND OF THE INVENTION

1. Field of the Invention

The present invention relates to an authentication device and an authentication system for authentication, and a sensor used in the authentication.

2. Description of the Related Art

As a network including Internet has been extended and an information telecommunication technology has advanced recently, on-line business and on-line information exchange have been booming. Accordingly, electronic commerce, which is a non-face-to-face commerce over a network, has been thriving. Thus, individual authentication is getting required in much more occasions ever.

Authentication is performed in various ways; having a password input for identifying a person, certifying a person with a certification such as IC card, etc. Each way has inevitable troubles: The former has a problem of leakage and forgetting or lapse of memory, the latter has a problem of theft and loss. Therefore, biometrics authentication has widely come into use as individual authentication with high accuracy and safety.

Biometrics authentication is roughly divided into two types; a way using person's physical characteristics such as fingerprint authentication or face authentication, and a way using person's behavioral characteristics such as signature authentication. For example, Patent Document 1 discloses an example of fingerprint authentication.

The way using person's physical characteristics has high accuracy in authentication but has a problem in being relatively vulnerable to forgery. On the other hand, the way using person's behavioral characteristics has relatively low accuracy in authentication but has an advantage in being protective against forgery.

As a pattern recognition algorithm for authentication, DP (Dynamic Programming) matching technique for calculating similarity between two patterns with DP, particularly in voice recognition field (for example, see Non-Patent Document 1, 2).

[Patent Document 1] Japanese Patent Laid-Open No. 10-91769

[Non-Patent Document 1] Yoshinori Kamisaka and Kazuhiko Oma, "Algorithm for pattern recognition and learning", bun-ichi-sogo-shuppan

[Non-Patent Document 2] Masao Haruta, Tetsuo Funada, Shinji Hayashi, Kazuya Takeda, Image Information Media Basic Technology Series I "Sound information processing", Eizo-Joho media-kai edition, corona-sha

SUMMARY OF THE INVENTION

The present invention has been made in view of the above circumstances and provides an authentication device and an authentication system for performing individual authentication by using both physical characteristics and behavioral characteristics in a comprehensive manner and a sensor that can be preferably used in the device and the system.

An authentication device according to the present has:

a detection section that detects variance in friction between a finger and a surface of the detection section when relative movement between the surface of the detection section and the finger occurs; and an authentication section that authenticates a person based on time-series data representing variance in friction detected at the detection section.

The phrase "relative movement of a surface moves occurs on a finger" may refer to the case where a finger moves on a surface of a detection section, or where a surface of a detection section or a part of a surface of a detection section moves on a finger, or where both a finger and a surface of a detection section move on each other.

An authentication device according to the present invention is a device to authenticate a person with time-series data obtained by making the person to move a finger on the device (or making the device to move on a finger). In other words, according to the device of the present invention, matching is performed by using a fingerprint as characteristics and "a movement" as behavioral characteristics.

In the authentication device according to the present invention, the detection section is preferably provided with a protruded part whose tip touches a finger when relative movement between a surface of the protruded part and the finger occurs.

This facilitates detection of variance in friction depending on both a fingerprint and "a movement".

In the authentication device according to the present invention, the authentication section is preferably provided with a template storing section that stores template data to be compared with time-series data representing variance in friction detected at the detection section;

a similarity calculation section that calculates similarity between time-series data representing variance in friction detected at the detection section and template data stored in the template storing section; and a similarity determination section that determines whether the similarity calculated in the similarity calculation section is greater than certain similarity or not.

In this case, the similarity calculation section preferably calculates similarity between the time-series data and the template data by using DP matching technique.

Even if a person tries to do the same "movement", speed varies for each movement or even for each part of a single "movement" to some extent. DP matching technique produces a result obtained equal to what obtained by pattern matching that nonlinearly expands or contracts a pattern represented by time-series data in the direction of time axis. This prevents degradation of accuracy in authentication due to the speed variance.

In the authentication device according the present invention, the authentication section is preferably provided with a data quality determination section that determines whether time-series data representing variance in friction detected at the detection section is appropriate for authentication or not, and the similarity calculation section preferably calculates similarity between the time-series data determined to be appropriate for authentication at the data quality determination section and the template data.

With the data quality determination section, the device determines whether obtained time-series data is appropriate for authentication or not instead of immediately starts authentication processing for the time-series data. This reduces chances of performing unnecessary authentication processing. This enables an early response to a user such as giving a user an indication in an early stage to repeat a performance the user did for authentication, for example, to repeat moving a finger on the device, when the obtained time-series data is not appropriate for authentication processing.

An authentication system according to the present invention is provided with a detection device that detects variance in friction between a finger and a surface of the detection device when relative movement between the surface of the detection device and the finger occurs, and an authentication device that authenticates a person based on time-series data representing variance in friction detected at the detection device.

The present invention may include a detection device and an authentication device as separate components, allowing authentication performed by passing time-series data obtained at the detection device to the authentication device.

In the authentication system according to the present invention, the detection device is preferably provided with a protruded part whose tip touches a finger when relative movement between a surface of the protruded part and the finger occurs.

In the authentication system according to the present invention, the detection device preferably compresses time-series data obtained by detecting variance in friction between a finger and the detection device to send out the compressed data to the authentication device; and the authentication device preferably decompresses the compressed data sent from the detection device to recover the time-series data and performs authentication based on the recovered time-series data.

With time-series data compressed in the detection device and sent to the authentication device for decompression, amount of data to be sent can be reduced.

The sensor according to the present invention is located to touch a finger and provided with a detection section that detects variance in friction between the finger and the surface of the detection section when relative movement between the surface of the detection section and the finger occurs.

The sensor according to the present invention can preferably be applied to the authentication device and the authentication system according to the present invention.

The sensor according to the present invention is preferably provided with a supporting section that supports a finger placed on the sensor and the detection section is preferably located to touch the finger supported by the supporting section.

With the supporting section, high reproduction of variance in friction between a finger and the sensor can be kept when the detection of the variance is repeated.

In the sensor according to the present invention, the detection device is preferably provided with a protruded part whose tip touches a finger when relative movement between a surface of the protruded part and the finger occurs.

Specifically, the detection section can be composed of piezoelectronic element.

As mentioned above, according to the present invention, authentication is performed by using both physical characteristics and behavioral characteristics in a comprehensive manner.

The present invention also provides effects below:

(a) A very small and light system with high portability can be implemented as the authentication is performed by a very simple system;

(b) More protective against forgery as it uses behavioral characteristics; and (c) A user is less uncomfortable with this invention than with a fingerprint or face authentication technique.

DETAILED DESCRIPTION OF THE PREFERRED EMBODIMENTS

Now, embodiments of the present invention will be described.

Figure 1:
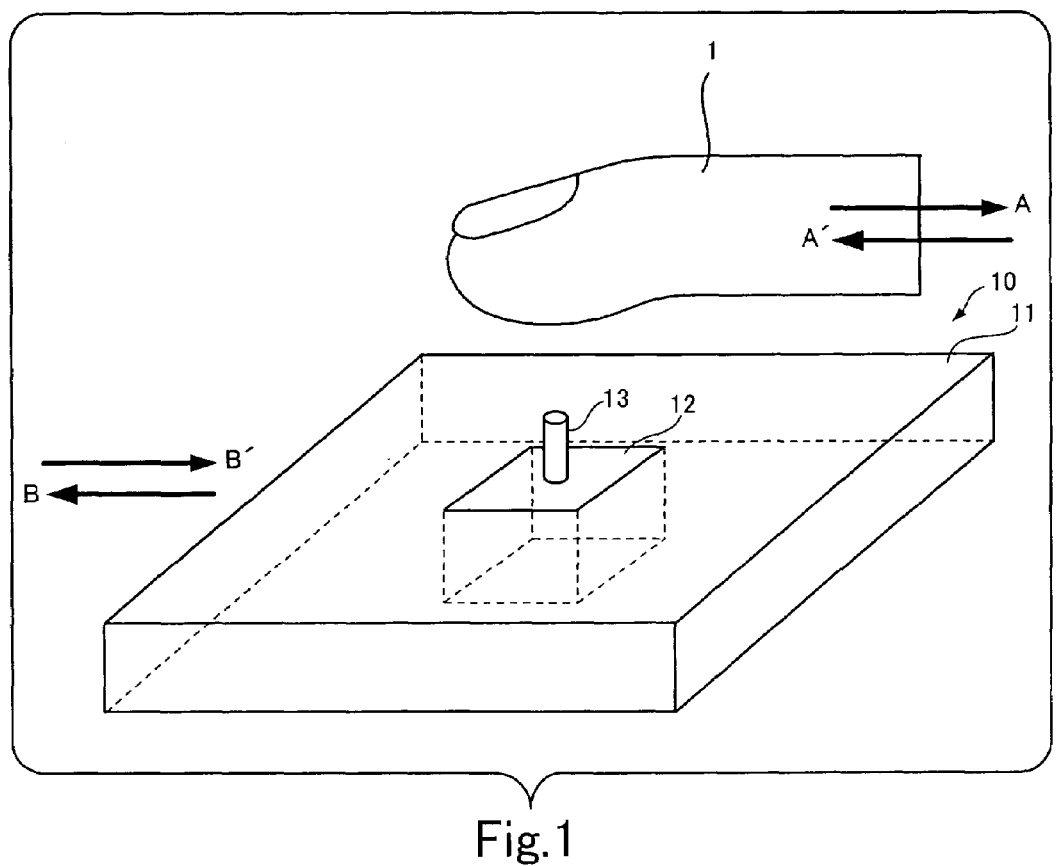
FIG. 1 is a conceptual diagram of a detection section of an authentication device in the present invention.

FIG. 1 is a conceptual diagram of a detection section in an authentication device of the present invention.

Detection section 10 shown in FIG. 1 has detection circuit section 12 embedded in support 11. Protruding section 13 whose tip touches a finger is fixed on detection circuit section 12. Protruding section 13 is composed of PZT (piezoelectric element). When finger 1 is placed on protruding section 13 and moved in the direction of an arrow A or A', protruding section 13 obtains a fingerprint of the finger and variance in friction in accordance with the finger movement, and detection circuit section 12 generates a signal based on the variance in the friction.

Although it is described that a finger moves in the direction of an arrow A or A' here, detection section 10 can be moved in the direction of an arrow B or B' instead of or in addition to merely moving a finger.

Figure 2:
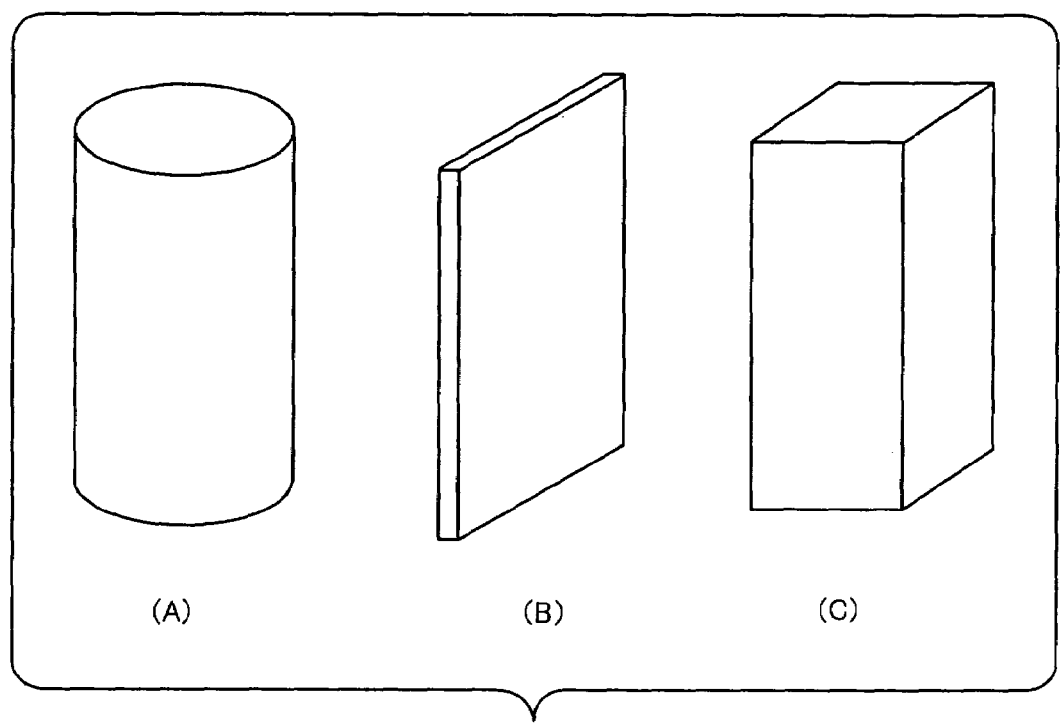
FIG. 2 is a diagram showing examples of variable shapes of a protruding section on a detection section shown in FIG. 1.

FIG. 2 is a diagram showing examples of variable shapes of protruding section 13 on detection section 10 shown in FIG. 1.

Although a cylindrical protruding section 13 as part (a) of FIG. 2 is depicted in FIG. 1, protruding section 13 is not limited to the cylindrical shape and it may be any shape that can pick up variance in friction from a fingerprint and "movement", for example, a blade shape as part (b) of FIG. 2 or a prism shape as part (c) of FIG. 2.

Figure 3:
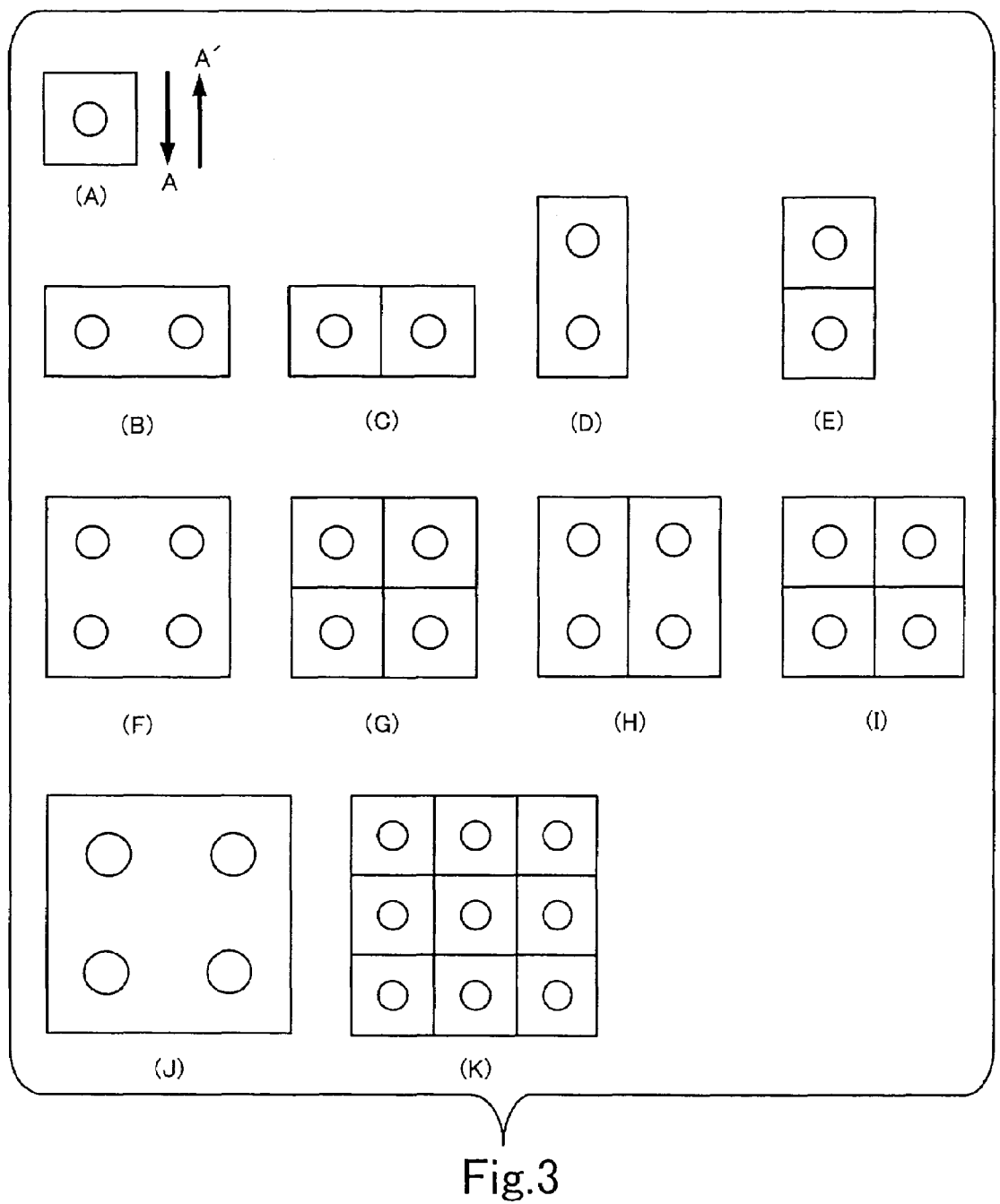
FIG. 3 is a diagram showing various examples representing relationship between a protruding section and a detection circuit section.

FIG. 3 is a diagram showing various examples representing relationship between a protruding section and a detection circuit section.

Each of circles in parts (A)–(K) of FIG. 3 represents a protruding section that picks up variance in friction of a finger. Each of rectangles around the circle(s) represents a detection circuit section that generates a signal for representing variance in friction of a finger when the finger moves on it.

A finger (or detection section) should be moved in the direction of an arrow A or A' shown in part (A) of FIG. 3 in all the aspects of parts (A)–(K) of FIG. 3 as represented in part (A) of FIG. 3.

Part (A) of FIG. 3 shows a basic pattern with one protruding section and one detection circuit section. A single movement of a finger on the tip of a protruding section produces one signal.

Part (B) of FIG. 3 shows two protruding sections arranged across the width of a finger with one detection circuit section. When a finger is moved on both tips of the protruding sections once, protruding sections obtains variance in friction from different parts of the fingerprint respectively. The variances in friction picked up from the two protruding sections are combined into one signal.

Part (C) of FIG. 3 shows two protruding sections arranged across the width of a finger with two corresponding detection circuit sections. When a finger is moved on both tips of the protruding sections once, two signals are output, each representing variance in friction picked up at each protruding section. For example, similarity is calculated for each of the two signals used for authentication by determining whether the total similarity of the two similarities is greater than a certain similarity.

Part (D) of FIG. 3 shows two protruding sections arranged along a finger with one detection circuit section. When a finger is moved on both tips of the protruding sections once, each protruding section principally obtains variance in friction from each part along a line on a fingerprint. The variances in friction picked up from the fingerprint on a line at different times by the two protruding sections are combined into one signal.

Part (E) of FIG. 3 shows two protruding sections arranged along a finger with two corresponding detection circuit sections. When a finger is moved on both tips of the protruding sections once, each protruding section obtains variance in friction from each part along a line on a fingerprint and generates two signals principally for different times. These two signals are processed in the same way as in the case of Part (C) of FIG. 3.

Since parts (F)–(K) of FIG. 3 can be described in the same manner as above, description of the figures will be omitted.

With combination of protruding sections and detection circuit sections, a fingerprint can be used in a complex manner or more signals can be generated. This can be combined with behavioral characteristics such as "movement" to enhance authentication to protect against forgery and to realize more accurate authentication.

Only a detection section in an authentication device of the present invention is described above. Now, whole of the authentication device will be described.

Figure 4:
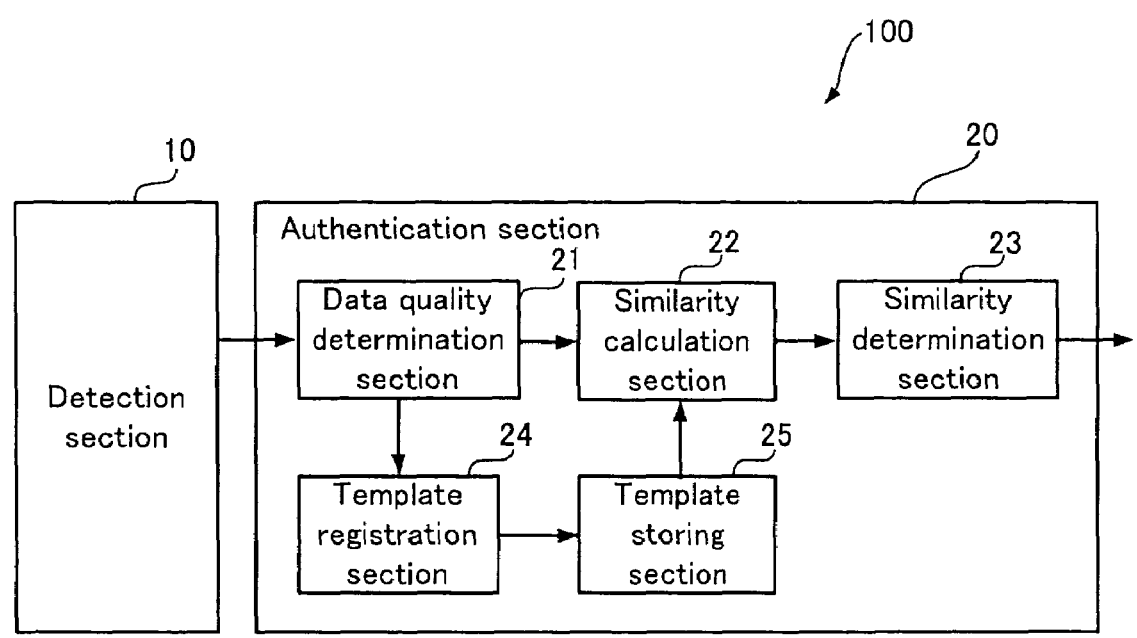
FIG. 4 is a block diagram showing one embodiment of an authentication device according to the present invention.

FIG. 4 is a block diagram showing one embodiment of an authentication device according to the present invention.

Authentication device 100 shown in FIG. 4 has detection section 10 and authentication section 20. Authentication section 20 has data quality determination section 21, similarity calculation section 22, similarity determination section 23, template registration section 24, and template storing section 25.

Detection section 10 is responsible for detecting variance in friction between a finger and detection section 10 while a surface of detection section 10 is moved on the finger. Since detection section 10 is described with reference to FIGS. 1–5 above, it will not be described further.

Authentication section 20 is responsible for performing authentication on the basis of time-series data representing variance in friction detected at detection section 10. Data quality determination section 21 in authentication section 20 generates time-series data by converting a signal obtained at detection section 10 into an A/D signal and determines whether the time-series data is appropriate for authentication or not. If the time-series data is determined appropriate for authentication, the time-series data is input into similarity calculation section 22 or template registration section 24 according to the condition.

Specifically, when it is specified to store template data in template storing section 25 by manipulating a manual operation button (not shown), the time-series data that is determined appropriate for authentication at data quality determination section 21 is input in template registration section 24, which stores the time-series data into template storing section 25 as template data. When an authentication is performed, the time-series data that is determined appropriate for authentication at data quality determination 21 is input in similarity calculation section 22.

When an authentication is performed, since template storing section 25 stores template data to be compared with time-series data representing variance in friction detected at detection section 10 as described above, similarity calculation section 22 calculates similarity between the time-series data determined appropriate for authentication at data quality determination section 21 and template data stored in template storing section 25.

Similarity calculation section 22 uses DP matching technique for calculating similarity in the present invention. DP matching will be described later.

Similarity obtained at similarity calculation section 22 is input in similarity determination section 23, where the similarity obtained at similarity calculation section 22 is determined to be greater than a certain similarity or not.

When detection section 10 is configured to generate multiple pieces of time-series data like part (C) or (E) of FIG. 3, multiple pieces of template data corresponding to the multiple pieces of time-series data are stored in template storing section 25. Then similarity is calculated for each of the multiple pieces of time-series data at similarity calculation section 22. Similarity calculation section 22 adds up the similarities and sends the sum to similarity determination section 23. Similarity determination section 23 determines whether the sum of the similarities is greater than a certain similarity or not. As the authentication device is small and light, it can be incorporated in a cellular phone or a PDA (Personal Data Assistant), for example. When the device is incorporated in a cellular phone or a PDA, for example, the authentication result is used for licensing of a portable phone or PDA, though the device shown in FIG. 4 is not limited to be used for a certain purpose.

Figure 5:
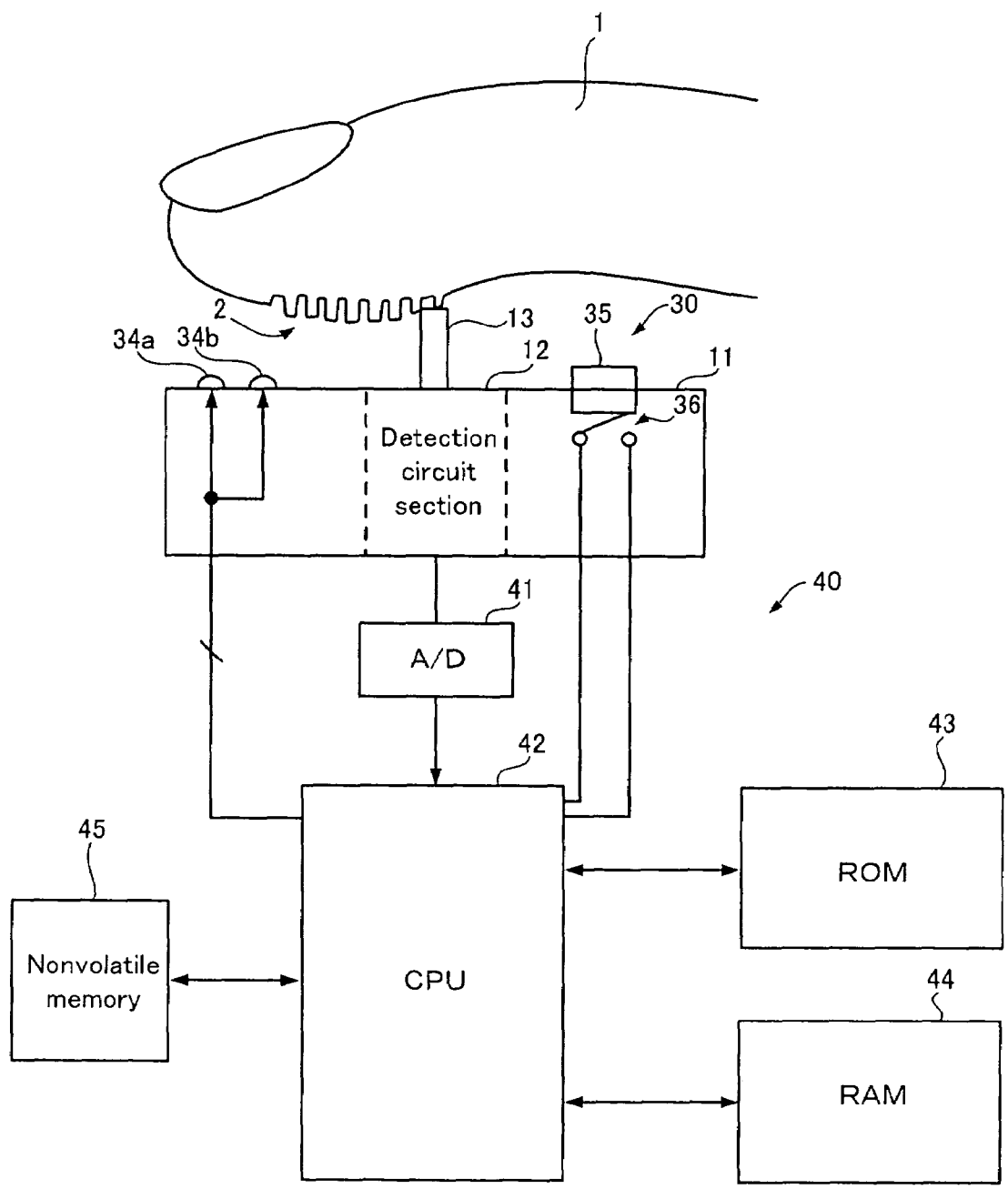
FIG. 5 is a block diagram showing more specific embodiment of an authentication device according to the present invention.

FIG. 5 is a block diagram showing more specific embodiment of an authentication device according to the present invention.

The authentication device shown in FIG. 5 has detection section 30 and authentication section 40.

Detection section 30 is the same as detection section 10 shown in FIG. 1 for the basic configuration. Like numerals indicate like parts in the detection section shown in FIG. 1. Description of detection section 30 will be omitted.

Red LED 34*a* and green LED 34*b* are placed on detection section 30 that indicates an authentication result based on a signal obtained at detection section 30. Red LED 34*a* lights on or flickers, when data cannot be authenticated or when data is determined to disagree with any piece of registered template data. Green LED 34*b* lights on or flickers, when data is determined to agree with any of the pieces of registered template data, for example. This will be described more specifically later.

Push button 35 and switch 36, which is turned on by pushing push button 35, is depicted on detection section 30 in FIG. 5. Push button 35 is manipulated for switching the mode between a template data registering mode and an authentication mode or for deleting registered template data.

Authentication section 40 provided for the authentication device shown in FIG. 5 has a microcomputer system and a program executed thereon. With respect to hardware, authentication section 40 has A/D converter 41 for converting a signal representing variance in friction obtained at detection circuit section 12 into digital time-series data, CPU 42 for executing a program for calculation, ROM 43 for storing a program, RAM 44 for temporally storing various pieces of data such as the time-series data, and nonvolatile memory 45 for storing template data in nonvolatile manner.

As described with reference to FIG. 1, protruding section 13 is composed of PZT (piezoelectric element). When finger 1 is moved on the tip of protruding section 13, the finger moves on the upper surface of protruding section 13 with fingerprint 2 being captured at the tip of protruding section 13. Then detection circuit section 12 generates a signal representing how fingerprint 2 is captured at protruding section 13, i.e., variance in friction between protruding section 13 and finger 1. Detection circuit section 12 filters the generated signal to cut frequency component higher than the frequency component representing variance in friction resulted from a fingerprint. Then detection circuit section 12 sends the filtered signal to A/D converter 41, where the signal is converted into digital time-series data.

Although it is described that protruding section 13 is composed of PZT, it can be configured such that PZT is located in detection circuit section 12 on which protruding section 13 is disposed and jolt due to variance in friction between protruding section 13 and a finger is transmitted to PZT via protruding section 13 and the jolt transmitted to PZT is detected.

In the mode of registering time-series data as template data via CPU 42, the time-series data output from A/D converter 41 is stored in RAM 44 temporally and then in nonvolatile memory 45. In the authentication mode, the time-series data is temporally stored in RAM 44 for authentication. This will be described more specifically later.

Figure 6:
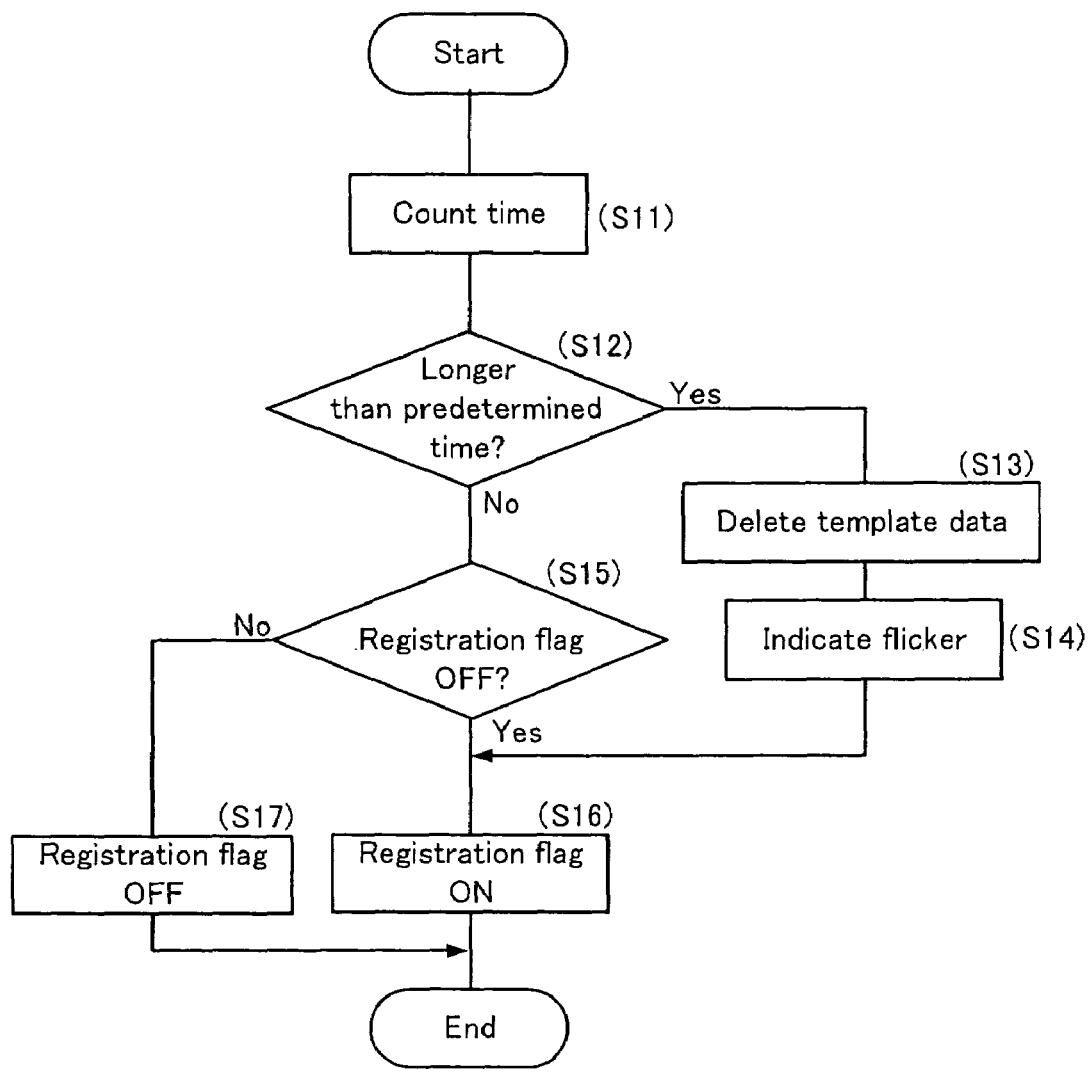
FIG. 6 is a flowchart of a program that is triggered by pushing a push button.

FIG. 6 is a flowchart of a program that is triggered by turning on switch 36 when push button 35 provided for detection section 30 shown in FIG. 5 is pushed.

At first, time between when push button 35 shown in FIG. 5 is pushed and switch 36 is turned on and when push button 35 is released and switch 36 is turned off is counted (step S11). Next, it is determined whether the counted time is greater than a predetermined time, for example one second, or not (step S12). When the time is greater than the predetermined time, template data stored in nonvolatile memory 45 shown in FIG. 5 is deleted (step S13). Then an indication is output to flicker both red LED 34*a* and green LED 34*b* shown in FIG. 5 for a certain times to inform the user that template data has been deleted (step S14). A registration flag is turned on so that time-series data will be registered as template data when time-series data is read in next time (step S16).

When the registration flag is on, the device is in a mode of registering new template data, and when it is off, the device is in an authentication mode. This will be described more specifically later.

When it is determined that the time counted at step S11 is less than a certain time at step S12, the process proceeds to step S15. At step S15, it is determined whether registration flag is on or off. When the registration flag is off, the process proceeds to step S16, where the registration flag will be turned on. When the registration flag is on, the process proceeds to step S17, where the registration flag will be turned off.

The registration flag is initialized to off at power-up.

Specifically, the mode switches between the template registration mode and the authentication mode each time push button 35 shown in FIG. 5 is pushed for a short time. When push button 35 is pushed for a longer time (for example, more than one second), stored template data is deleted and the mode is switched to the mode of registering new template data.

Although it is described that push button 35 is pushed to delete template data or to register new template data, the device is preferably provided with a safety net to prevent template data being deleted when a user does not expect or to prevent a new piece of template data being registered in an unauthorized manner. For example, push button 35 is not available until some complex manipulation is done on multiple manual operation buttons (not shown) (for example "a numeric keypad") (e.g., when a user manipulates according to the procedure decided beforehand, such as pushing at a time particular three buttons registered beforehand). The type of safety net depends on the use and the like of the authentication device. It will be described later as an example that template data cannot be registered or so until an administrator inserts a key into a keyhole.

Figure 7:
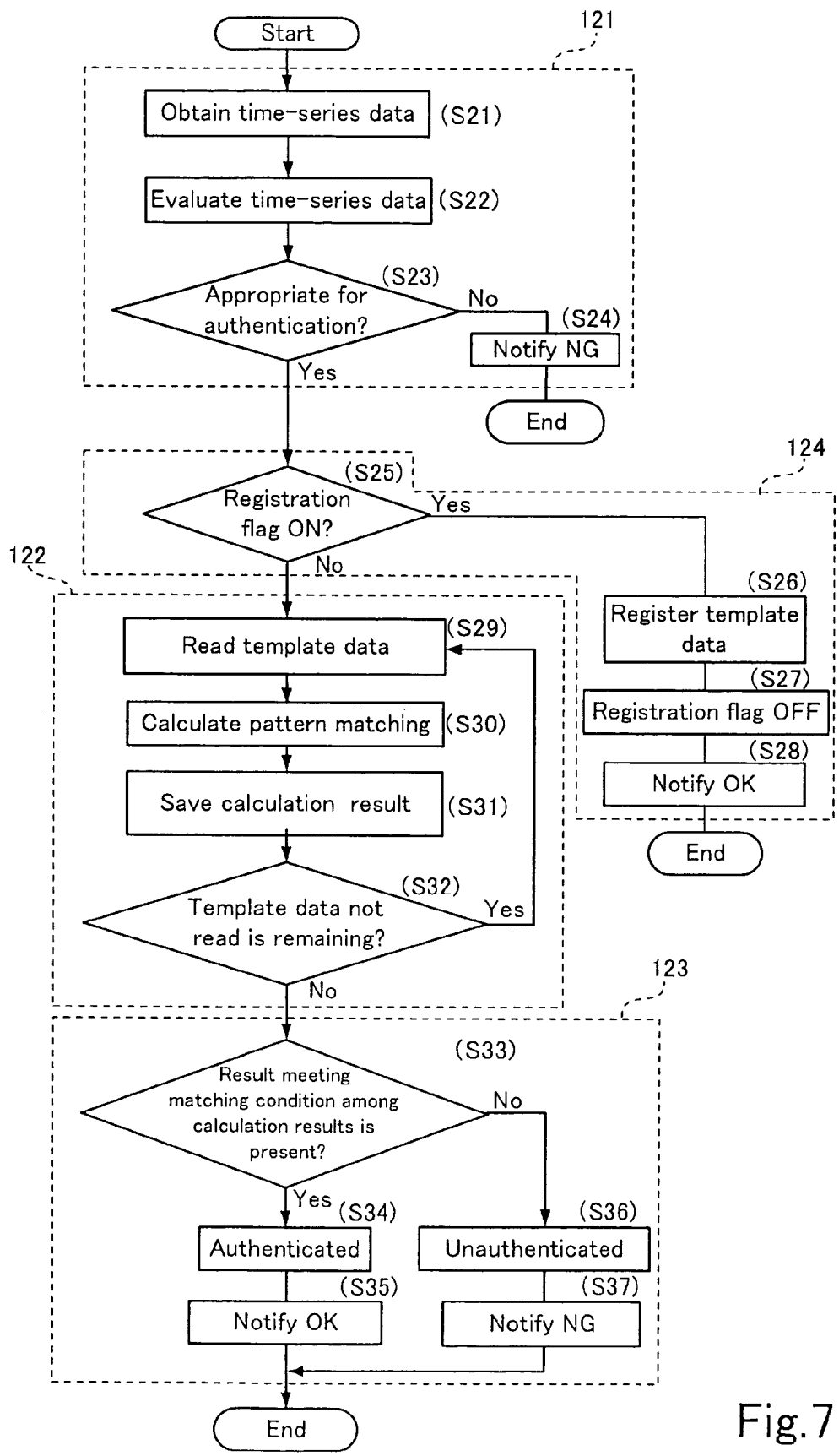
FIG. 7 is a flowchart of a program executed when a signal is input from a detection section.

FIG. 7 is a flowchart of a program executed when a signal is input from detection section 30 shown in FIG. 5.

CPU 42 shown in FIG. 5 repeatedly monitors whether data above a certain threshold is input from A/D converter 41 or not while the power is on. When data above a certain threshold is input, a program shown in FIG. 7 is started in order to detect variance in friction of a finger placed on the tip of protruding section 13.

At first, time-series data output from A/D converter 41 is obtained by amount for a single authentication, for example, the data is obtained until the value of the time-series data is lowered below a certain value, and stored in RAM 44 (step S21). Then, the time-series data is read out from RAM 44 and evaluated for its quality, i.e., determined if the data is appropriate for authentication or not (step S22). If authentication is performed for every time even when a user without any intention to be authenticated unexpectedly touches protruding section 33 shown in FIG. 5 or when a user with intention to be authenticated fails to properly move a finger and the finger comes off the tip of protruding section 33, notification of authentication failure comes to the user too late.

In the present embodiment, at step S22, duration, a mean value, and a deviation for a signal are calculated as an evaluation value for evaluating the quality of the time-series data obtained at step S21. At step S23, it is determined whether the data is time-series data appropriate for authentication or not based on whether any of the connection time, the mean value, and the deviation is within each of certain ranges or not.

When it is determined the data is time-series data inappropriate for authentication at step S23, red LED 34a on detection section 30 is flickered to notice the user that the authentication failed at step S24.

When it is determined the data is time-series data appropriate for authentication at step S23, the process proceeds to step S25, where it is determined whether a registration flag is set on or off.

When it is determined the registration flag is on at step S25, the process proceeds to step S26, where CPU 42 stores the time-series data, which is currently obtained from A/D converter 41 and saved in RAM 44, into nonvolatile memory 45 as template data. Then the registration flag is turned off (step S27), and green LED 34b is flickered to notice the user that template data has been registered (step S28).

When it is determined the registration flag is off at step S25, processing for authentication is performed. Specifically, the process proceeds to step S29, where one piece of template data stored in nonvolatile memory 45 is read in and a pattern matching calculation between the read in template data and the currently obtained time-series data is performed (step S30). A result of the pattern matching calculation, i.e., data representing similarity between the template data and the time-series data, is saved in RAM 44 (step S31). If multiple pieces of template data have been stored in nonvolatile memory 45, the multiple pieces of template data are read out one by one and the processing shown in steps S29–S31 is repeated (step S32).

The present invention employs DP matching technique in a pattern matching calculation at step S30. This will be described more specifically later.

When processing through steps S29–S31 is completed for all pieces of template data, the process proceeds to step S33, where it is determined whether the calculation results saved in RAM 44 at step S31 include any result meeting the matching condition or not. When a result meeting the matching condition exists, the person is determined "authenticated" (step S34). Then, processes following the authentication are performed according to the use of the authentication device. Specifically, when the device is incorporated in a cellular phone or PDA, the cellular phone or the PDA is made available to the user. Also, green LED 34b is flickered to notice the user that the authentication succeeded (step S35).

When a result meeting the matching condition does not exist at step S33, the process proceeds to step S36, and the person is determined "unauthenticated". Then, processes following the unauthentication are performed according to the use of the authentication device. Specifically, the cellular phone or PDA incorporated with this authentication device is left unavailable. Also, red LED 34b is flickered to notice the user that the authentication failed (step S37).

Since pattern matching is performed by DP matching at step S30 in the embodiment, the result is determined to meet the matching condition when the calculation result obtained by DP matching is smaller than a certain value (The smaller the calculation result, the greater the similarity.) at step S33.

DP matching technique is not necessarily applied in the pattern matching calculation at step S30. Other technique can be used in addition to DP matching technique. In such a case, determination is performed according to the used technique at step S33.

A program shown in FIG. 7 is a program executed in CPU 42 in the embodiment illustrated in the block diagram of FIG. 5. The program shown in FIG. 7 corresponds to the embodiment illustrated in the block diagram in FIG. 4. Specifically, program part 121 including steps S21–S23 in FIG. 7 corresponds to data quality determination section 21 in FIG. 4, program part 122 including steps S29–S32 in FIG. 7 corresponds to similarity calculation section 22 in FIG. 4, program part 123 including steps S33–S37 in FIG. 7 corresponds to similarity determination section 23 in FIG. 4, and program part 124 including steps S25–S28 in FIG. 7 corresponds to template registration section 24 in FIG. 4. In addition, nonvolatile memory 45 in FIG. 5 corresponds to template storing section 25 in FIG. 4.

Figure 8:
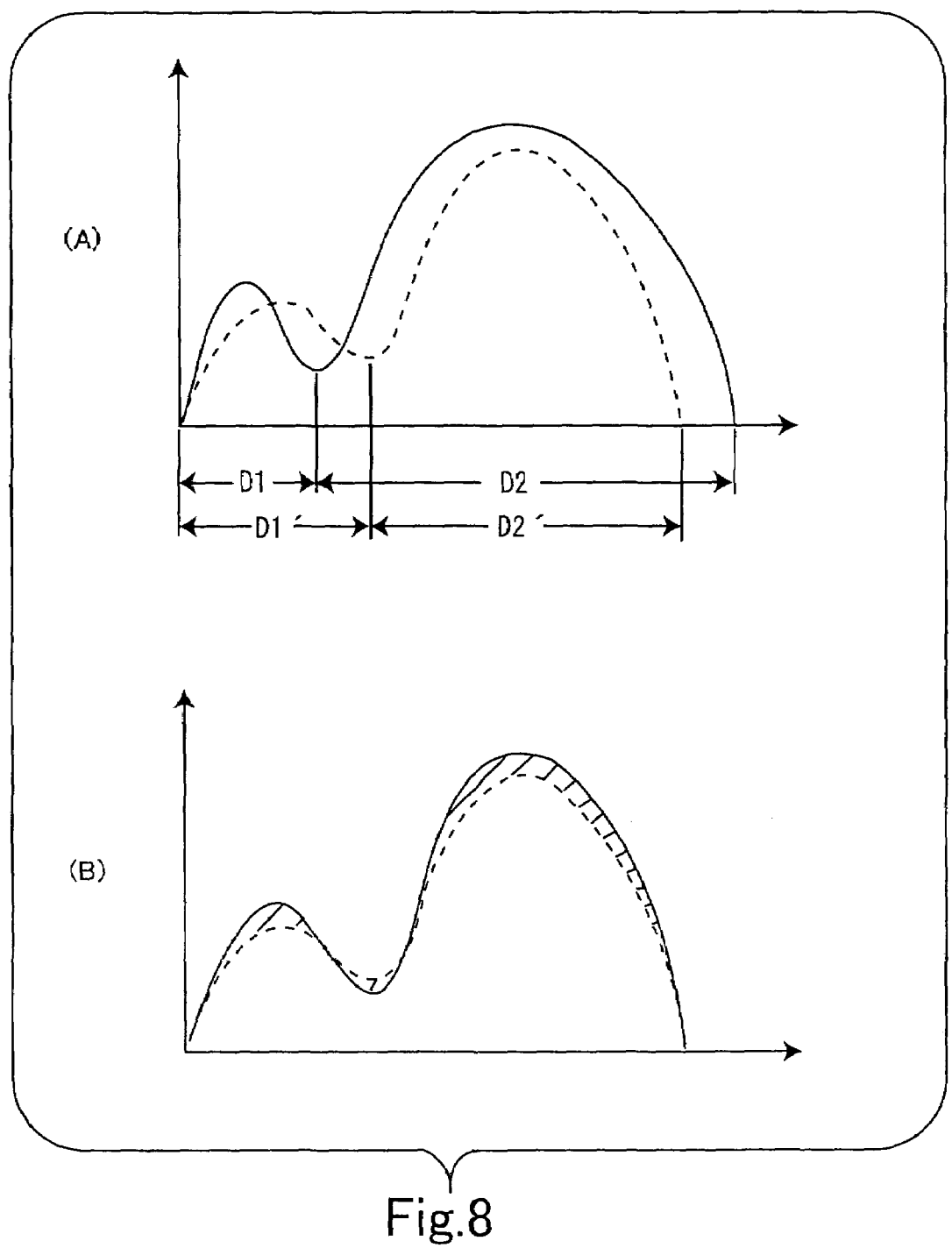
FIG. 8 is a conceptual diagram representing a calculation result calculated when DP matching is applied.
Figure 9:
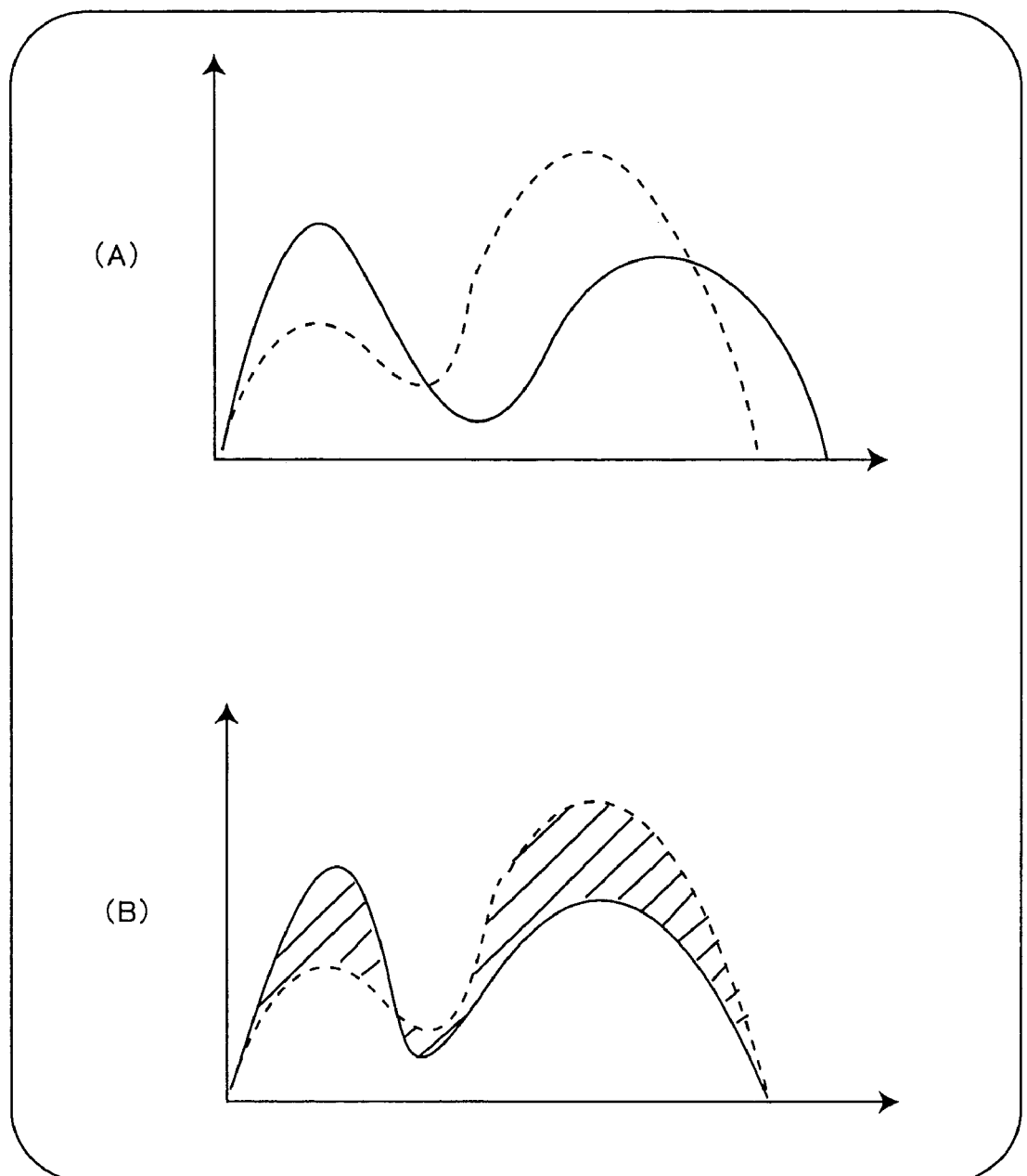
FIG. 9 is a conceptual diagram representing a calculation result calculated when DP matching is applied.

FIGS. 8 and 9 are conceptual diagrams representing calculation results obtained when DP matching technique is used.

DP matching is conceptually one pattern-matching technique for performing a calculation equal to what calculating similarity by nonlinearly expanding or contracting time-series data in the direction of time axis to appropriately match with template data.

For example, in order to calculate similarity between template data shown in dashed line in part (A) of FIG. 8 and time-series data shown in solid line in part (A) of FIG. 8, region D1 shown in part (A) of FIG. 8 of the time-series data is expanded in the direction of time axis (horizontal axis) so as to match with region D1' of the template data, and region D2 of the time-series data is contracted in the direction of time axis (horizontal axis) so as to match with region D2' of the template data. As a result, the time-series data (solid line) appears quite similar to the template data (dashed line) as shown in part (B) of FIG. 8. The time-series data is nonlinearly expanded or contracted in the direction of time axis to calculate similarity between template data and time-series data, for example, the diagonally shaded area in part (B) of FIG. 8 (the smaller the area, the greater the similarity) as shown in part (B) of FIG. 8.

FIG. 9 is the same as FIG. 8. When the template data shown in dashed line in part (A) of FIG. 9 is compared with the time-series data shown in solid line in part (A) of FIG. 9, the time-series data is nonlinearly expanded or contracted in the direction of time axis (horizontal axis) to appear as the solid line shown in part (B) of FIG. 9. Then, a value corresponding the similarity between the modified time-series data and the template data (for example, the diagonally shaded area in part (A) of FIG. 9) is calculated.

Figure 10:
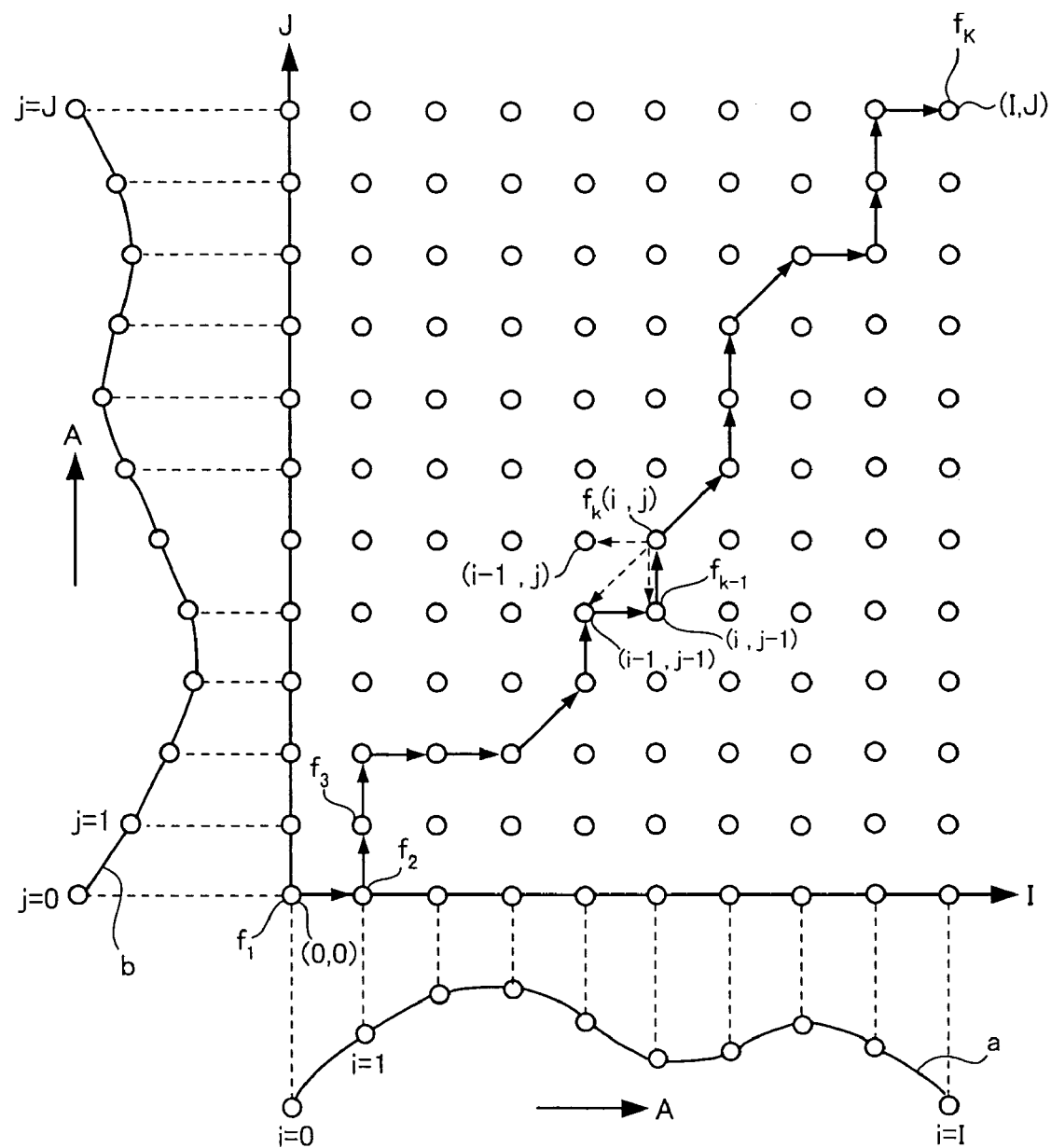
FIG. 10 illustrates an exemplary calculation of DP matching.

FIG. 10 illustrates an exemplary calculation of DP matching.

Now, an exemplary calculation corresponding to the concept of DP matching will be described with reference to FIGS. 8 and 9.

Similarity between pattern "a" and pattern "b" will be calculated. Pattern "a" is the time-series data obtained when finger 1 is moved in the direction of an arrow A shown in FIG. 1 which is registered as template data. Pattern "a" is a set of I+1 pieces of sampling data $\{a_0, a_1, \ldots, a_I\}$, where i=0, 1, . . . , I.

Pattern "b" is the time-series data obtained when finger 1 is moved in the direction of an arrow A shown in FIG. 1 at authentication. Pattern "b" is a set of J+1 pieces of sampling data $\{b_0, b_1, \ldots, b_J\}$, where j=0, 1, . . . , J.

A value $d_{i,j}$ in $$d_{i,j}=|a_i-b_j|$$

is assigned to each point on a two dimensionally arranged grid, where a point (i, j) represents a coordinate.

A series $\{f_1, f_2, f_3, \ldots, f_k, f_{k+1}, \ldots, f_K\}$ is a set of points on the path between a point (0, 0) and a point (I, J), on which the sum of values shown below is the minimum.

A path is obtained from the end point $f_K$ to the starting point $f_1$ on the series in order. When a path from $f_k$ (coordinate (i, j)) to $f_{k-1}$ is obtained, values $d_{i, j-1}$, $d_{i-1, j-1}$, $d_{i-1, j}$ assigned to three points at the under, lower left, and left to $f_k$ point (i, j) respectively are considered to find the minimum value by comparing three values with weighing the lower left point $d_{i-1, j-1}$ twice as much as the under point ($d_{i, j-1}$) or the left point ($d_{i-1, j}$). In other words, the minimum value is found from three values of $d_{i, j-1}$, $2d_{i-1, j-1}$, $d_{i-1, j}$.

Here, $d_{i, j-1} < 2d_{i-1, j-1} < d_{i-1, j}$. A grid point of coordinate (i, j-1) is $f_{k-1}$. In this manner, the minimum value which is shown as S in the following formula (1) is obtained.

$$S = \sum_{k=1}^{K} \cdot w_k \cdot d_k / (I + J) \quad (1)$$

where $w_k$ is a weighting factor, which is 1 to proceed down under or to the left and 2 to proceed to lower left, and $$\sum_{k=1}^{K} \cdot w_k = I + J \quad (2)$$

In the formula 1, $d_k$ is a value assigned to the point $f_k$ (for example, when the coordinate of the point $f_k$ is (i, j), $d_k = d_{i, j} = |a_i - b_j|$). Here, S corresponds to the diagonally shadowed area in FIGS. 8(B) and 9(B).

At step S30 in FIG. 7, a pattern matching calculation is performed with DP matching in this manner.

DP matching is a known pattern matching technique that is detailed in Non-Patent Document 1 and Non-Patent Document 2. Thus, the technique will be just outlined here.

Now, results of an experiment performed according to the present invention will be described.

(A Laboratory Device and Experiment Condition)

Figure 11:
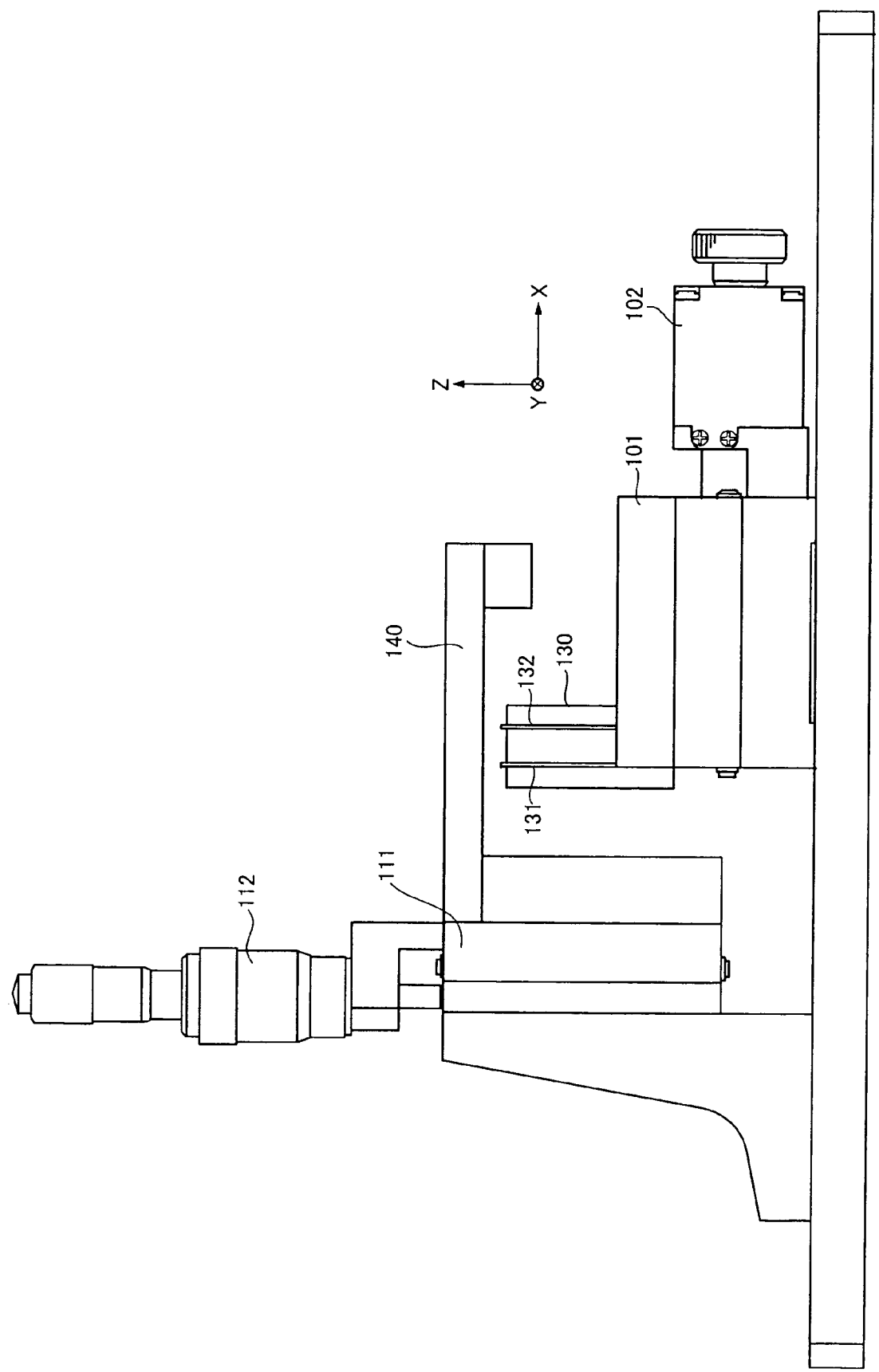
FIG. 11 shows an overview of a laboratory device.

FIG. 11 shows an overview of a laboratory device. FIG. 11 corresponds to one embodiment of a sensor according to the present invention.

As a sensor to obtain friction information, piezoelectric element (PZT) was used. PZT are applied to thin boards 131 and 132, which are 0.1 mm thick. The thin boards are sandwiched between acryl boards 130 on automation stage 101 (which is moved in the direction of X axis by pulse motor 102) and fixed in parallel. In order to roughly match the place where thin boards 131, 132 touch a finger, guide 140 is provided for supporting a finger placed on boards 131 and 132. Guide 140 is fixed on jogging stage 111 that is moved in the direction of Z axis by micrometer 112. As jogging stage 111 is moved in the direction of Z, the way the finger touches thin boards (PZT) 131, 132 can be changed.

Figure 12:
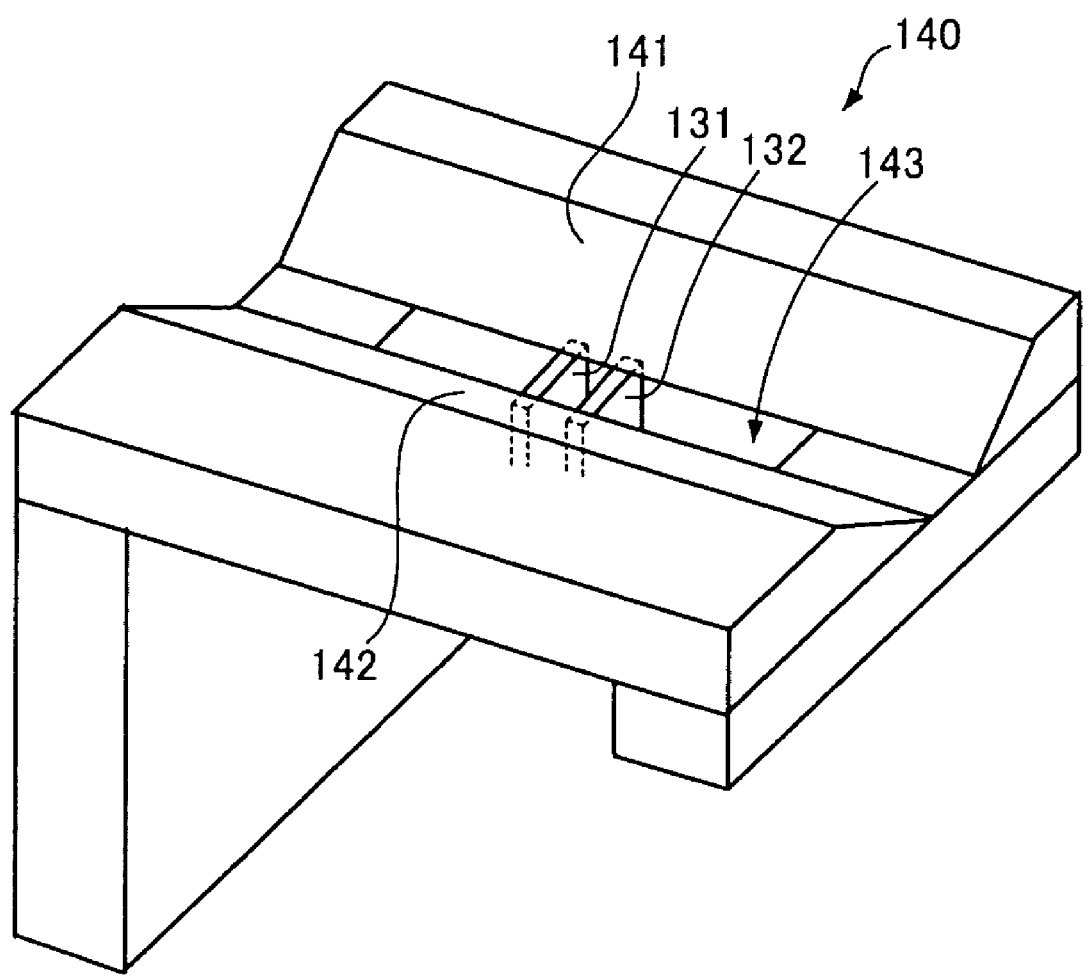
FIG. 12 shows a perspective view of a guide supporting a finger in the laboratory device shown in FIG. 11.

FIG. 12 shows a perspective view of a guide supporting a finger in the laboratory device shown in FIG. 11. The guide's location with respect to the thin boards applied with PZT is also shown.

Guide 140 has two slopes 141, 142 lowering toward the center at both side, with the center part in the middle of slopes 141 and 142 being provided with a rectangular aperture 143. When a finger is placed on aperture 143, the finger is guided along slopes 141 and 142 on each side so that the finger is placed on the same position in the same posture every time the finger is placed there. The top parts of two thin boards 131 and 132 with PZT's locate just under the aperture 143. When a finger is placed on aperture 143 by moving jogging stage 111 shown in FIG. 11 in the direction of Z, the height of guide 140 can be adjusted so that the fingerprint part of the finger touches on the two thin boards with appropriate pressure.

Here, two thin boards 131, 132 with PZT's are fixed with an interval of 5 mm, with the top parts of thin boards 131, 132 locating 0.1 mm from the bottom of guide 140. An output voltage that occurs when PZT's are distorted under a finger is captured in a personal computer for analysis.

(Procedure of the Experiment)

[i] Extracting the Basic Information with an External Drive

This experiment was performed five times in a row for each subject. A right index finger was placed on guide 140 and stay so as to the fingerprint part of the finger touches PZT's. Then automation stage 101 is driven for 20 mm in the direction of X axis at 20 mm/s. Confirmation was made before and after driving automation stage so that the whole fingerprint part of the finger passes on two thin boards 131, 132.

[ii] Extracting Information Obtained from Arbitrary Friction

This experiment was performed five times in a row for each subject. Ask a subject to arbitrarily slide the finger along the guide in the direction of X axis toward the subject, with automation stage 101 fixed in place. The condition was that the fingerprint part of the right index finger should be used, and the touching part of the finger should not be changed significantly.

[iii] Examination of Arbitrariness of Template Waveform

In order to examine a possibility that a standard waveform, which is data representing a person at authentication, can be divided into patterns according to the person's intention, this experiment was performed by asking an individual to change the length of the finger to insert, speed of movement, an angle between the finger and the guide, touching part of the finger and the like at the person's discretion. The only condition was a right index finger should be used.

(Experiment Result)

[i] Extracting the Basic Information with an External Drive

Figure 13:
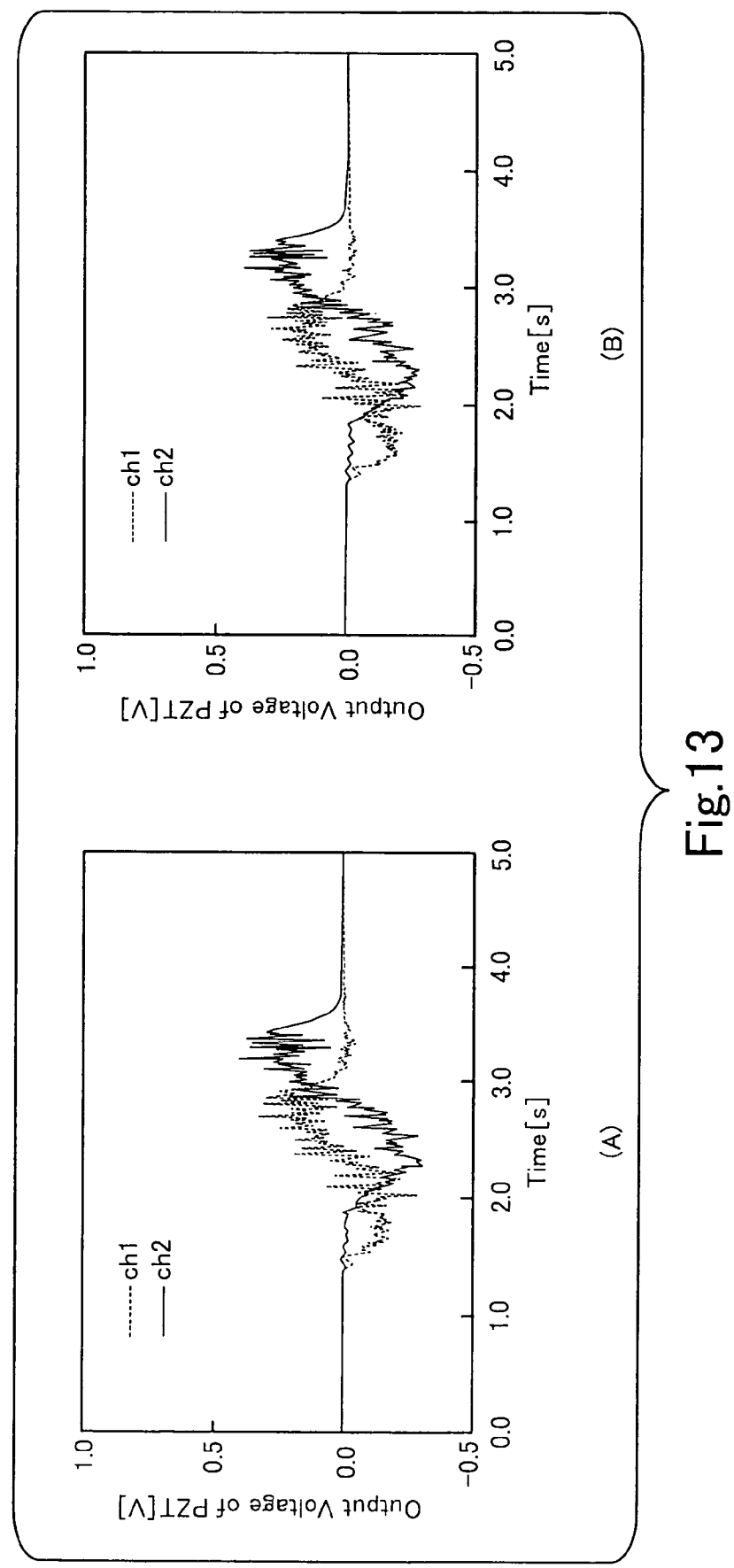
FIG. 13 shows experiment results.
Figure 14:
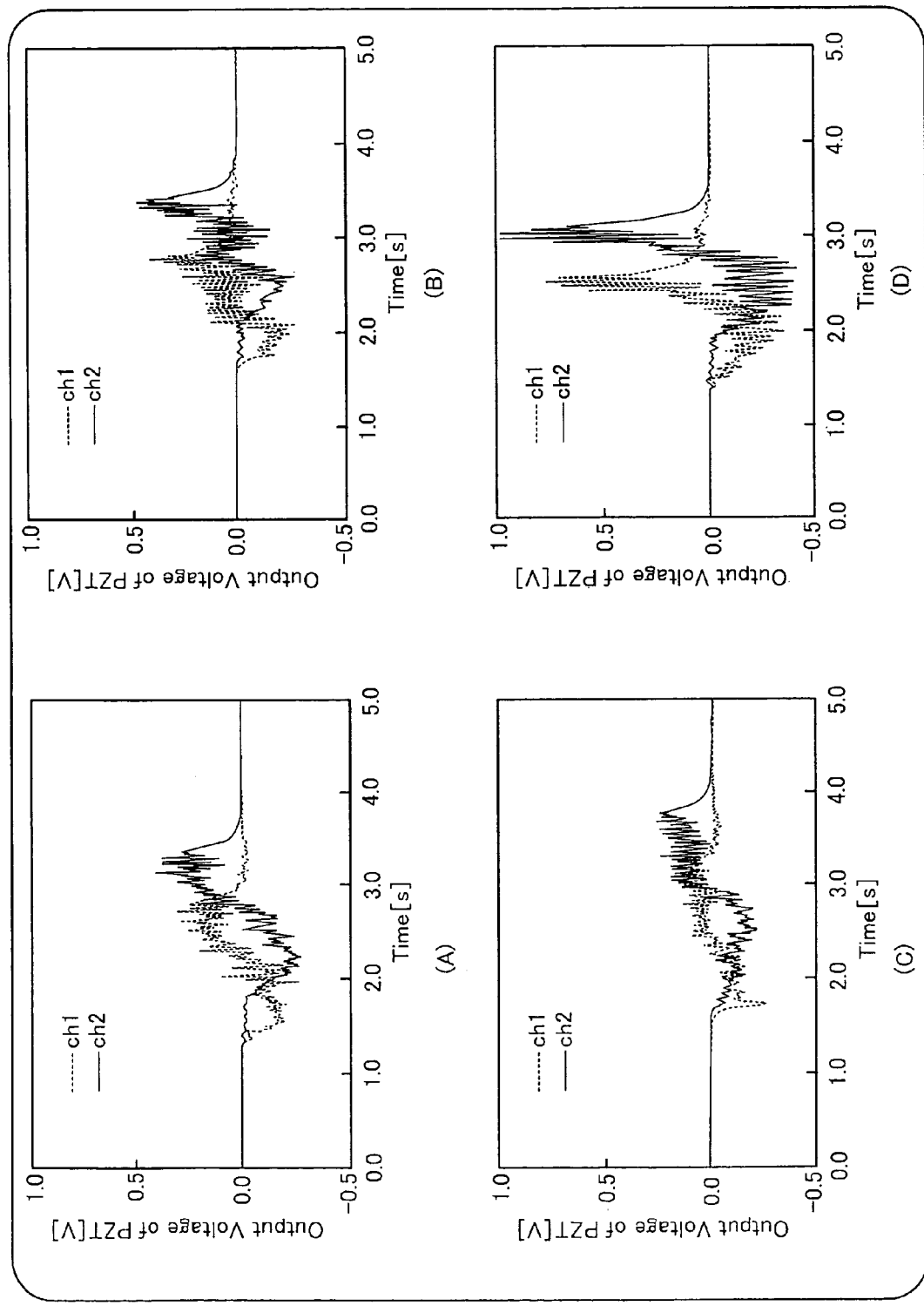
FIG. 14 shows experiment results.

The experiment results are shown in FIGS. 13 and 14. "ch1" and "ch2" in the figures represent output voltages from the first and the second PZT's from automation stage 111, respectively. After repeating the experiment for the same subjects, it was confirmed that quite similar waveforms were obtained at each performance for all the subjects (FIG. 13). When waveforms were compared among different subjects, it was proved that each subject has own waveform (FIG. 14). A signal includes information on unevenness of a fingerprint as well as rough shape of the finger.

[ii] Extracting Information Obtained from Arbitrary Friction

Figure 15:
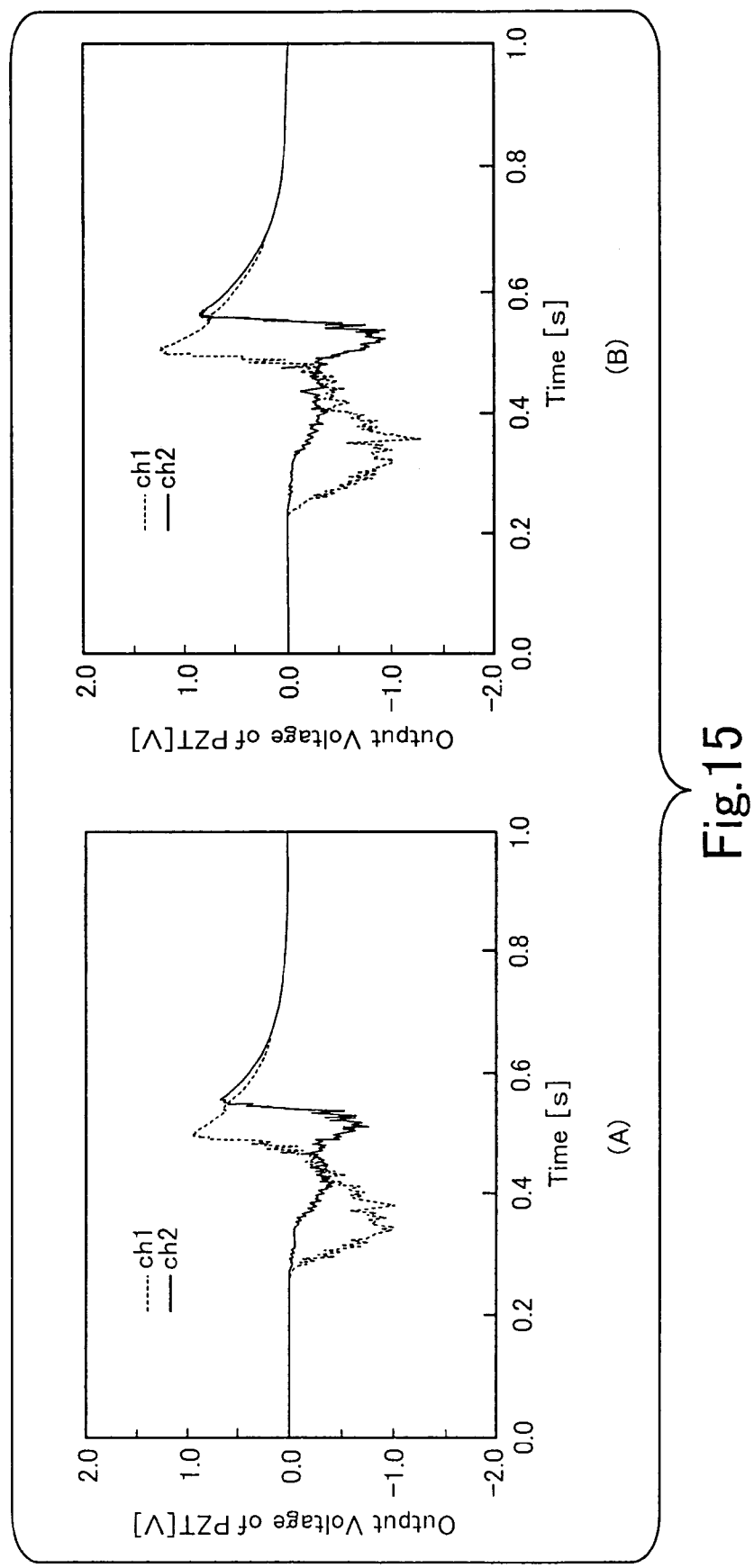
FIG. 15 shows experiment results.
Figure 16:
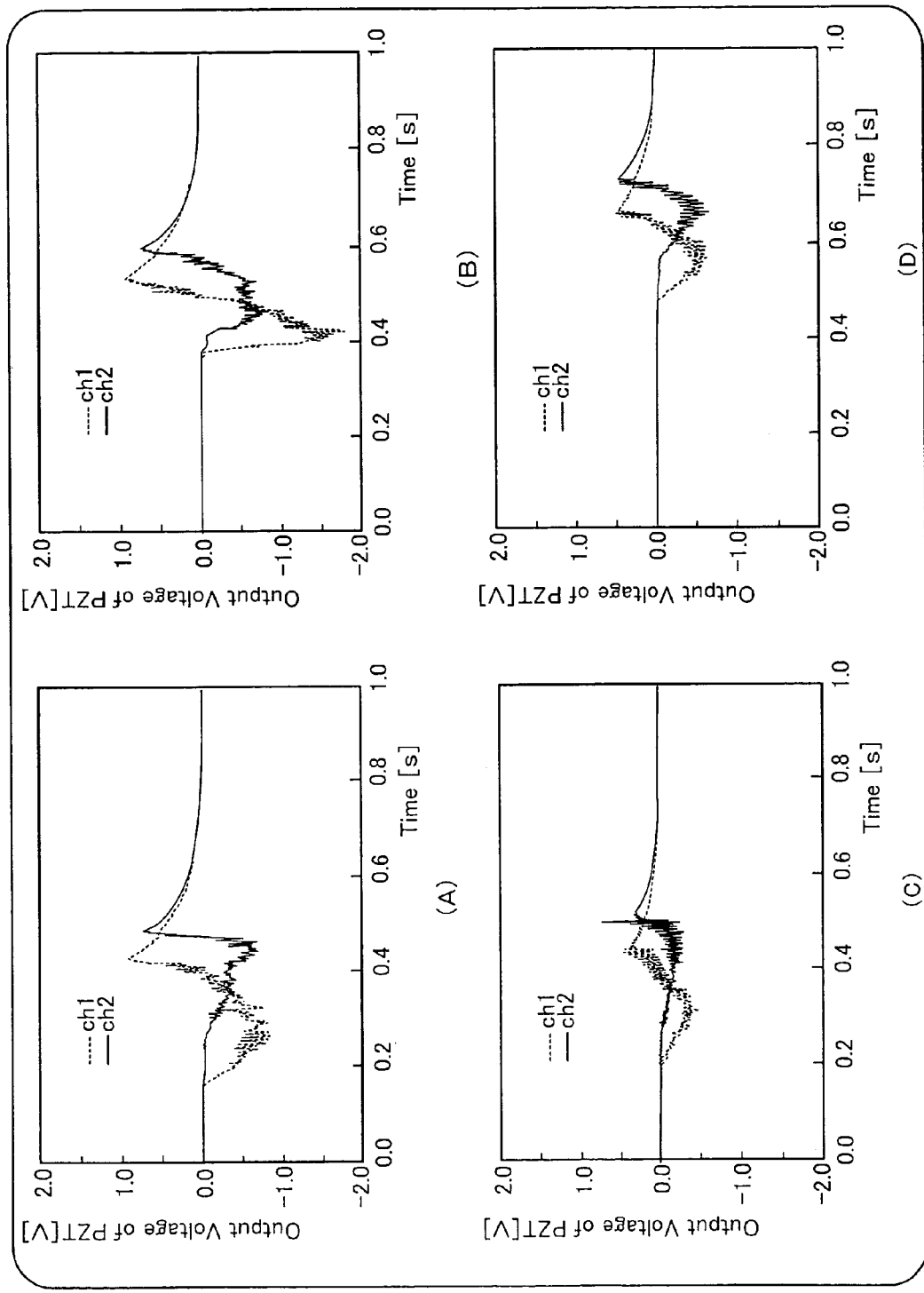
FIG. 16 shows experiment results.

The experiment results are shown in FIGS. 15 and 16. Although they have much more variances than FIG. 13, similar waveforms were obtained for the same subject (FIG. 15). The waveforms were different among different subjects as in FIG. 14; with tendencies for long period being similar, tendencies for short period being different (FIG. 16).

[iii] Examination of Arbitrariness of Template Waveform

Figure 17:
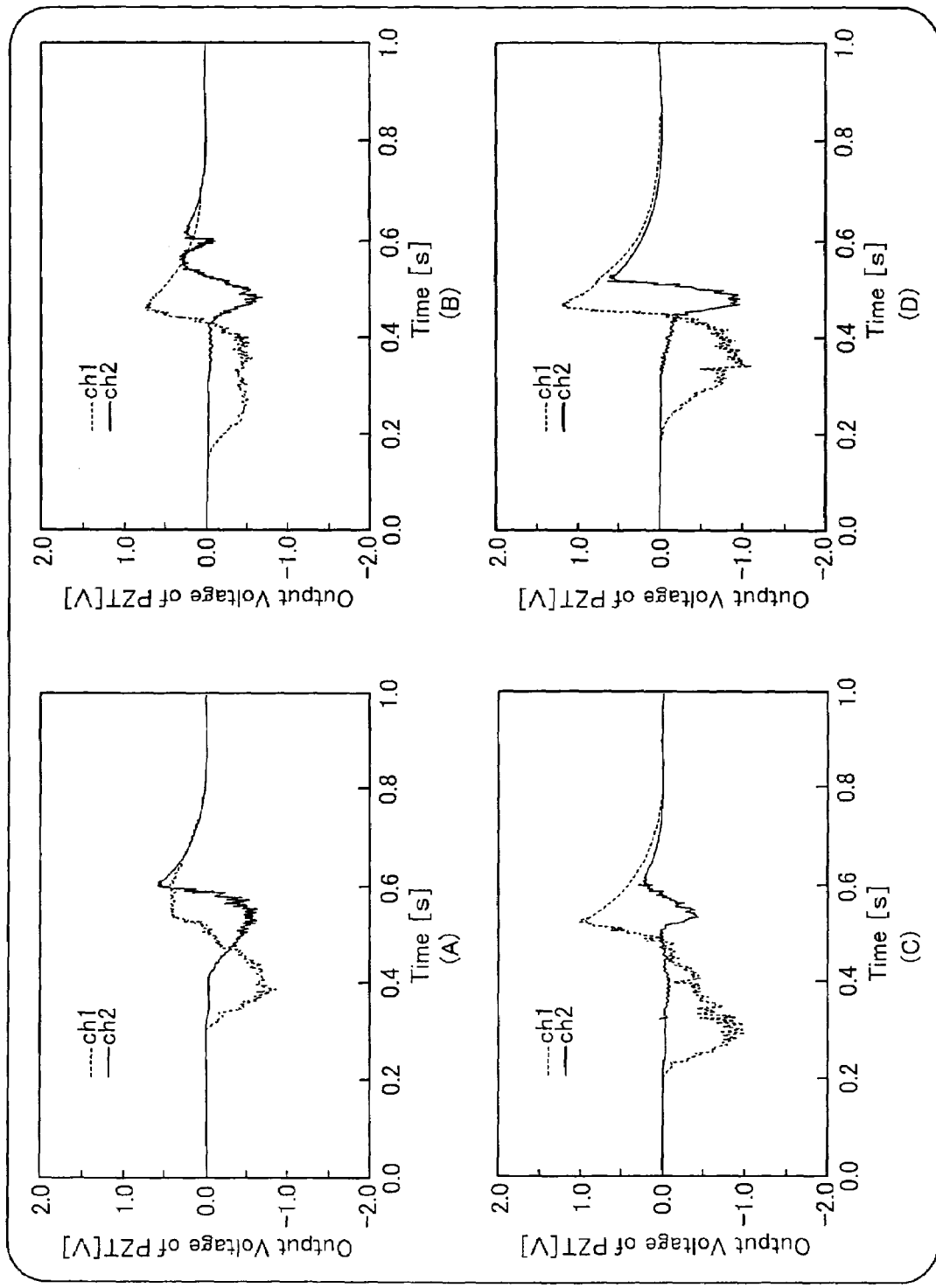
FIG. 17 shows experiment results.

The experiment results are shown in FIG. 17. FIG. 17 shows four typical types of waveform for a subject. After performing the same experiment upon all subjects, it was proved that each subject had specific variable patterns of waveform but also can repeatedly produce quite similar waveforms.

Table 1 shows results of comparison between time-series data and template data for trial by using the DP matching technique, with taking time-series data of subject A shown in part (A) of FIG. 15 as template data and each of parts (A)–(D) of FIGS. 16 as time-series data to be compared with the template data. Parts (A)–(D) of FIG. 16 show data for different subjects A, B, C, and D, respectively.

TABLE 1

|  | A | B | C | D |
|---|---|---|---|---|
| DP matching ch1 | 0.0098 | 0.0212 | 0.0710 | 0.0317 |
| DP matching ch2 | 0.0048 | 0.0100 | 0.0211 | 0.0098 |
| Sum | 0.0146 | 0.0312 | 0.0920 | 0.0415 |
| Comparison result (0.02 or less) | the person | the other person | the other person | the other person |

As shown in Table 1, all subjects other than the subject A (part (A) of FIG. 16) were determined to be other person with much allowance, where threshold was set below 0.02 for the sum of ch1 and ch2.

Table 2 shows results of pattern matching with a technique other than DP matching technique.

TABLE 2

|  | A | B | C | D |
|---|---|---|---|---|
| Correlation coefficient-ch1 | 0.95 | 0.85 | 0.95 | 0.93 |
| Correlation coefficient-ch2 | 0.99 | 0.88 | 0.92 | 0.90 |
| Correlation coefficient (1.90 or more) | 1.95 | 1.73 | 1.87 | 1.83 |
| Standardized Euclidean distance-ch1 | 52.71 | 86.57 | 268.39 | 162.25 |
| Standardized Euclidean distance-ch2 | 33.75 | 112.26 | 300.26 | 141.52 |
| Standardized Euclidean distance (100 or less) | 86.46 | 198.83 | 568.65 | 303.78 |
| Urban distance-ch1 | 449.69 | 1035.97 | 1265.02 | 1038.53 |
| Urban distance-ch2 | 147.11 | 581.72 | 626.71 | 469.89 |
| Urban distance (1000 or less) | 596.80 | 1617.69 | 1891.73 | 1508.42 |
| Comparison result (corresponding to more than two items) | the person | the other person | the other person | the other person |

As in the case of Table 1, time-series data of subject A shown in FIG. 15(A) is taken as template data and each of parts (A)–(D) of FIG. 16 is taken as time-series data to be compared with the template data. These are the results obtained by comparison for a trial by using three types of indicators (1) correlation coefficient, (2) standardized Euclidean distance, and (3) urban distance. The values for these indicators are taken when correlation coefficients for ch1 and ch2 are at the maximum after removing output around zero from the time-series data and sliding the time-series data against the template data simply in the direction of time axis. Then threshold for the sum of ch1 and ch2 is set to (1) 1.90 or more, (2) 100 or less, and (3) 1000 or less, respectively. Subjects other than subject A are determined to be other person by determining it is the identical person when a value meets two items among (1)–(3).

In this manner, accurate determination, i.e. accurate authentication, can be made even when pattern matching is performed with a technique other than DP matching.

Figure 18:
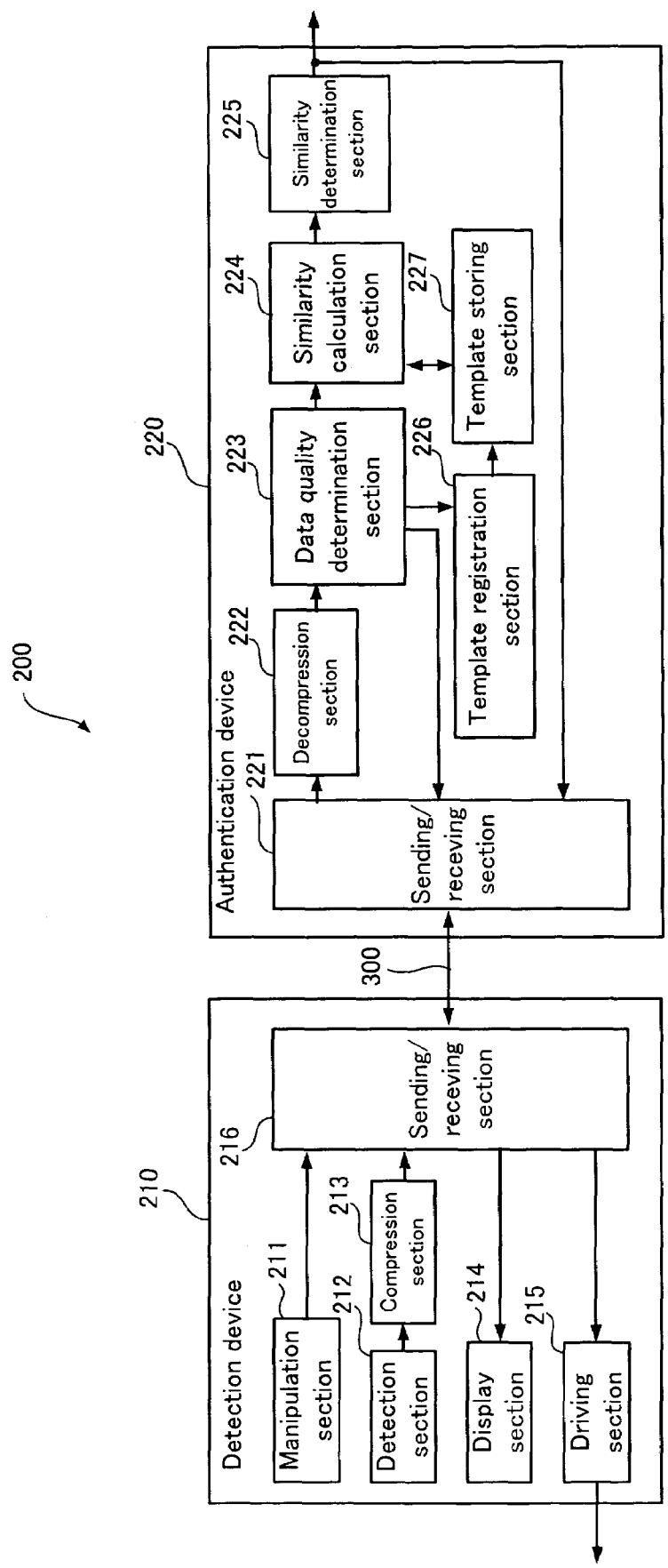
FIG. 18 is a block diagram showing one embodiment of an authentication system according to the present invention.

FIG. 18 is a block diagram showing one embodiment of an authentication system according to the present invention.

Authentication system 200 shown in FIG. 18 has detection device 210 and authentication device 220, connected each other via communication line 300. Although one detection device 210 is shown as a representative here, multiple detection devices may be used.

Detection device 210 has manipulation section 211, detection section 212, compression section 213, display section 214, driving section 215, and sending/receiving section 216. Authentication device 220 has sending/receiving section 221, decompression section 222, data quality determination section 223, similarity calculation section 224, similarity determination section 225, template registration section 226, and template storing section 227.

Detection section 212 included in detection device 210 is the same as detection section 10 in the embodiment shown in FIG. 4 (see FIG. 1) or as a laboratory device as one embodiment of a sensor shown in FIG. 11. Thus, redundant description will be omitted. A signal obtained at detection section 212 representing variance in friction of a finger is input in compression section 213 and converted into digital time-serial signal then compressed. The compressed data is sent from sending/receiving section 216 via communication line 300 to authentication device 220.

Manipulation section 211 includes a group of manual operation buttons, for example a numeric keypad, a keyhole and the like. Although it is described that the authentication device shown in FIG. 5 switches the mode between the template data registration mode and the authentication mode at each time pushing button 35 is pushed, in the authentication system shown in FIG. 18, either template data registration or alteration is prohibited unless an administrator of the authentication system inserts the key held by the administrator into the keyhole. A numeric keypad provides keys for a person to input the person's identification number when the person wants to register template data or to be authenticated.

Display section 214, provided with a liquid crystal panel for example, displays information equal to what presented to a user by means of red LED 34a or green LED 34b on the authentication device shown in FIG. 5 in text or image and also various kinds of information according to the use of authentication system 200. Driving section 215 is for driving whatever according to the use of authentication system 200. For example, if this authentication system 200 is for controlling open-close/lock of a door, driving section 215 unlocks the door and display section 214 displays "Welcome" when the authentication succeeds.

In authentication device 220 included in authentication system 200, compressed data sent from detection device 210 via communication line 300 is received at sending/receiving section 221, decompressed at decompression section, and the original time-series data is recovered.

At the authentication, identification number of a person who wants to be authenticated is input from a manipulation section of detection device 210. Then the identification number is also sent to authentication device 220 via sending/receiving section 216 and communication line 300, and received at sending/receiving section 221 of authentication device 220.

Operations of data quality determination section 223, similarity calculation section 224, similarity determination section 225, and template registration section 226 are the same as program parts 121, 122, 123 and 124 of a program shown in FIG. 7 that is implemented at CPU 42 shown in FIG. 5. Operations of template storing section 227 in authentication device 220 shown in FIG. 18 is the same as those of nonvolatile memory 45 shown in FIG. 5. Thus, redundant description will be also omitted here.

Only the difference between them and the abovementioned embodiments will be described below.

Template registration section 226 stores template data in template storing section 227 together with identification number specified by a numeric keypad on manipulation section 211 of detection device 210 in association with the template data.

At the authentication, identification number input by manipulating a numeric keypad of manipulation section 211 for authentication is also input in similarity calculation section 224. Therefore, among pieces of template data stored in template storing section 227, only the template data stored in association with the same identification number as the identification number input for authentication is authenticated.

The determination result of data quality at data quality determination section 223 is transmitted via sending/receiving section 221 and communication line 300 to detection device 210, where the determination result of data quality is displayed on display section 214.

In the same manner, the determination result at similarity determination section 225 is also conveyed to detection device 211 via sending/receiving section 221 and communication line 300 and displayed on display section 214, while driving section 215 performs a desired driving.

The determination result at similarity determination section 225 is also used in authentication device 220 for, for example, recording history of authentication processing.

What is claimed is:

1. An authentication device including a detection section generating a signal, an authentication section that authenticates the identity of a person based on time-series data, and a sensor comprising:
    a detection circuit section for generating a signal
    a piezoelectronic element protruding therefrom, and
    an authentication section that authenticates the identity of a person based on time-series data representing variance in friction detected at the detection section,
    wherein said piezoelectronic element detects a fingerprint and variance in friction when relative movement between the piezoelectronic element and a finger occurs, said detection circuit section generates a signal representing a variance in friction between the piezoelectronic element and finger based on the detected fingerprint, and said authentication section authenticates the identity of a person based on time-series output volatage data representing variance in friction generated by the detection circuit section.

2. The authentication device according to claim 1, wherein the authentication section comprises:
    a template storing section that stores template data to be compared with time-series data representing variance in friction detected at the detection circuit section;
    a similarity calculation section that calculates similarity between time-series data representing variance in friction detected at the detection circuit section and the template data stored in the template storing section; and
    a similarity determination section that determines whether the similarity calculated in the similarity calculation section is greater than a certain similarity or not.

3. The authentication device according to claim 2, wherein the similarity calculation section calculates similarity between the time-series data and the template data by using a DP matching technique.

4. The authentication device according to claim 2, wherein the authentication section comprises:
    a data quality determination section that determines whether time-series data representing variance in friction detected at the detection circuit section is appropriate for authentication or not, and
    the similarity calculation section calculates similarity between the time-series data determined appropriate for authentication at the data quality determination section and the template data.

5. An authentication system according to claim 1, wherein the detection circuit section compresses time-series data obtained by detecting variance in friction between the and the detection circuit section to send out the compressed data to the authentication device, and the authentication device decompresses the compressed data sent from the detection circuit section to recover the time-series data and performs authentication based on the recovered time-series data.

6. The authentication device, comprising:
    a supporting section that supports a finger placed on the piezoelectronic protruding element,
    wherein said supporting section has two slopes lowering toward the center at both sides, with a center part in the middle of the slopes and being provided with a rectangular aperture guided along slopes and on each side, and the piezoelectronic element is located to touch the finger supported by the supporting section.

* * * * *